Sept. 22, 1931.  K. E. WENZEL  1,823,964
SLIDABLE BLOCK RAIL BRAKE
Filed Dec. 7, 1929
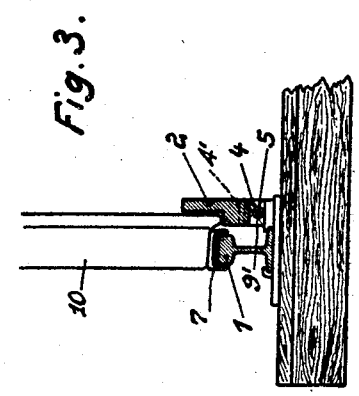
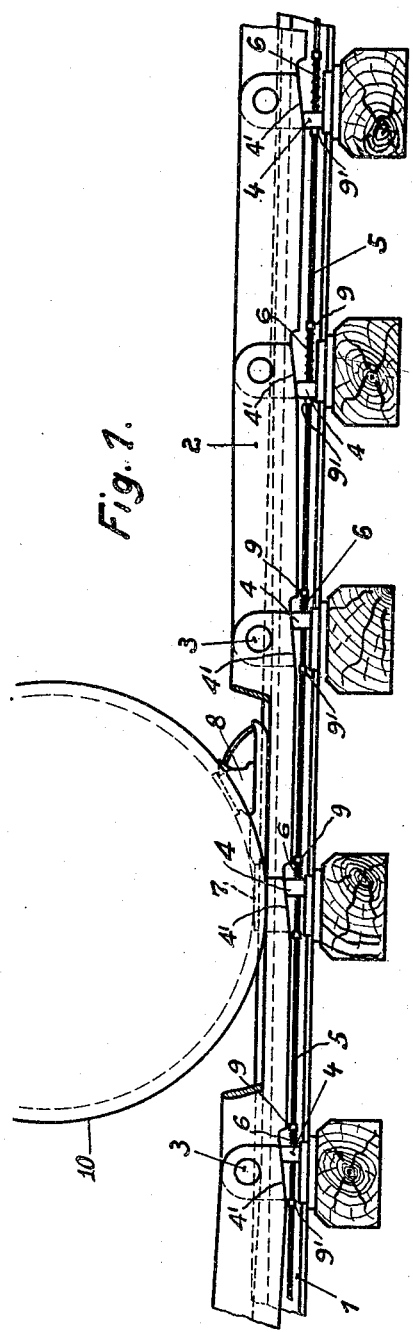
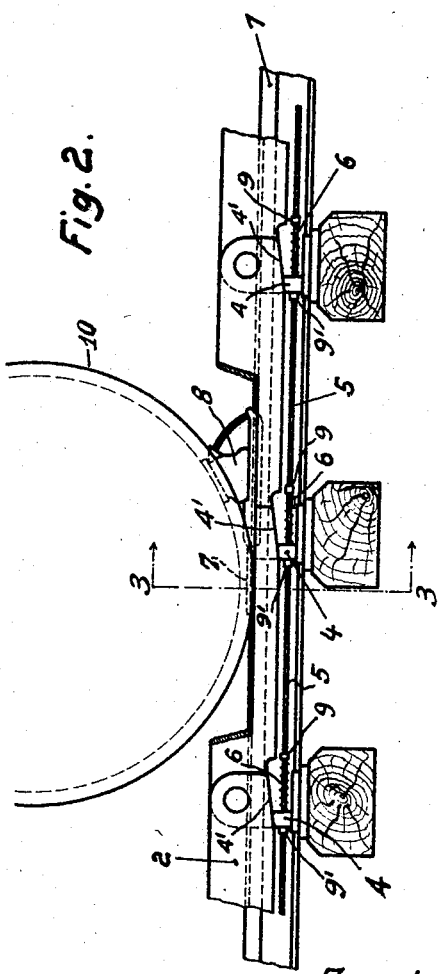
Witnesses:
J. Mundt
E. Förster.
Inventor:
Karl Ernst Wenzel
by
Attorney

Patented Sept. 22, 1931

1,823,964

UNITED STATES PATENT OFFICE

KARL ERNST WENZEL, OF HAMBORN-ON-THE-RHINE, GERMANY

SLIDABLE BLOCK RAIL BRAKE

Application filed December 7, 1929, Serial No. 412,374, and in Germany October 15, 1928.

The so-called scotch block brakes now in use have, besides the drawbacks adherent to scotch blocks as a braking means, the further disadvantage that it is not possible to control the length of the braking action after the braking has set in in such a manner as to vary the desired braking-force. In order to obtain the desired amount of braking force the distance travelled after the application of the brake is to be estimated already before the braking begins. After the scotch block has been placed in position it is not possible any more to control the braking action. Since, however, the intensity of the braking action of a scotch block varies considerably owing to uncontrollable factors it is desirable to regulate the amount of the braking force during the braking in accordance with the actually effected braking action.

It is the object of the present invention to satisfy this need by controlling the distance travelled after the application of the brake by lifting the wheel off the block, thus interrupting the braking action.

In order to attain this object a deformable ramp rail consisting of pivotally connected links is provided in parallelism to the main rails which in its lifted position supports the wheel flange thus relieving the slidable block of the wheel load. The lifting and lowering movement of said ramp rail is effected by rods and known controlling means such as distant controlled movable wedges, roller slides, excentrics or struts. Ahead of the actuating elements springs are arranged in such a manner as to make it possible to keep the link of the ramp rail which happens to support the axle out of action whilst the links of the ramp rail which either are not yet loaded or are already relieved of the load are simultaneously moved into their raised position by said springs and said actuating elements. This arrangement whose purpose, besides by the use of springs, may also be obtained for example by means providing for idle movement, has the advantage that only the ramp links which are relieved of their load are raised whereby the power necessary for operating the ramp members is considerably reduced.

In the annexed drawing one embodiment of the invention is illustrated. In this drawing Figure 1 shows a wheel of a track vehicle, the brake shoe inserted between said wheel and the rail as well as the means adapted to regulate the brake distance according to the present invention in that particular position in which the wheel is retarded by the brake shoe in the manner generally known. Figure 2 illustrates the same arrangement in which, however, the means for regulating the braking distance is caused to assume a position so that the retarding shoe is relieved of the wheel with the result that the retarding action is discontinued. Figure 3 finally shows a sectional view laid, in an arrangement as shown in Figure 2, through line 3—3 of said figure, i. e. the center of the wheel at right angles to the rail.

Referring to said drawing, 1 denotes the ordinary rail upon which the wheel 10 of the track vehicle rolls. In order to arrest the motion of the vehicle, as shown in Figure 1, a brake shoe 8 of the generally known kind is inserted between the wheel 10 and the rail 1. The braking action of the brake shoe 8 is produced by that the wheel 10, as shown in Figure 1, runs with its tread circle upon the channel-shaped part 7 lying upon the rail of the brake shoe 8 and comes to bear against the brake-shoe chair or bracket, brake action thus being caused by virtue of the friction between the latter and the wheel and by virtue of the friction set up between the said brake shoe blade and the rail.

Now, in order to be able to stop the retarding effect of the brake shoe 8 at a definite point of the braking distance, remote controlled lifting means are provided according to this invention whereby the wheel loading said brake shoe is lifted clear of the same at the desired point of the brake distance. The said lifting device consists of a deformable ramp rail 2 disposed parallel to the track rail and formed of relatively short sections or links articulated together by means of pivots 3. Acting beneath each of the pivotal joints of said ramp 2 is a wedge 4 which by the agency of a rod system 5 actuated by hand or otherwise is adapted to be slid horizontally forward and backward and which cooperates with a corresponding cam- or ramp-shaped part 4' formed in the ramp-rail 2 under said pivot 3. With three successive wedges 4 occupying a position as illustrated on the left-hand in Figure 1, the link of said ramp rail 2 located under the wheel 10 is lowered. But when the wedges 4 are caused to assume a position as illustrated in Figures 2 and 3 and on the right-hand in Figure 1 by the agency of the rod system 5, the ramp rail 2 is slightly raised.

The result of this action, as clearly shown in Figure 3, is that the wheel rim is made to run upon the raised ramp rail 2 so that the tread circle of the wheel is lifted above the channel-shaped part 7 of the brake shoe 8. Said latter is then relieved of the weight of the vehicle and is further pushed or slid by the wheel along the rail without a braking or retarding effect taking place.

Since it is impossible to lift a link of the deformable ramp rail 2 by the displacement of one or two wedges 4 whenever the said link happens to be loaded by a wheel of the vehicle, the said wedges 4 are slidably mounted upon the pull rod 5 each between two stops 9, 9' fixed on said rod, and are submitted to the action of compression springs 6, bearing against the stops 9 and tending to push said wedges towards the stop 9'. If the draw rod 5 is pulled toward the left-hand side into the raised position of the ramps, then, as clearly indicated in Figure 1, the links of the ramp-rail 2 not loaded by the wheel 10 are raised by the wedges 4, kept against the stops 9' by the action of said springs 6, while the links of the ramp rail 2 which are loaded by the wheel 10 remain in the lowered position due to the fact that the corresponding wedges 4 do not partake of the left-hand motion of the draw rod 5, for all that happens is that the intermediate springs 6 are compressed.

Having thus described my invention what I claim as new and desire to secure by Letters Patent is:

1. Means to regulate the braking distance or length in track or rail vehicles which are retarded by the agency of a brake shoe interposed between wheel and rail, comprising a remote-controlled lifting device by means of which the wheel loading the brake-shoe is adapted to be lifted clear of the brake shoe at a definite point of the braking distance.

2. Means to regulate the brake distance in rail vehicles which are retarded by the agency of a brake shoe interposed between wheel and rail, comprising a ramp rail piece disposed parallel to the running rail and capable of being raised and lowered, the said ramp rail when in raised position occupying a position so that the wheel rim of the wheel loading the brake shoe is caused to roll up thereon whereby the brake-shoe is relieved of the weight of the vehicle.

3. Means to regulate the brake distance in rail vehicles which are retarded by the agency of a brake shoe interposed between wheel and rail, comprising a deformable ramp rail parallel alongside the running rail and adapted to be raised and lowered, said ramp rail comprising a plurality of links articulated together by pivots and being capable of being raised and lowered, and which when in raised position are so disposed that the wheel rim of the wheel loading the brake shoe is caused to run up on the raised link whereby the brake shoe is relieved.

4. Means to regulate the brake distance in rail vehicles which are retarded by the agency of a brake shoe interposed between wheel and rail, comprising a deformable ramp rail parallel alongside the running rail and adapted to be raised and lowered, said ramp rail comprising a plurality of links articulated together by pivots, a controlling rod system wedge-shaped pieces slidably mounted on said rods under the articulations of the links of the ramp rail and between stops fixed on said draw rods and compression springs pressing on one side against said wedges, acting under each liftable and "lowerable" links of the ramp rail, with the consequence that all links of the ramp rail are raised with the exception of the part that happens to be loaded by the wheel at the time.

KARL ERNST WENZEL.